Jan. 16, 1940. S. S. STARZEC ET AL 2,187,435
STRAINER
Filed Sept. 23, 1937
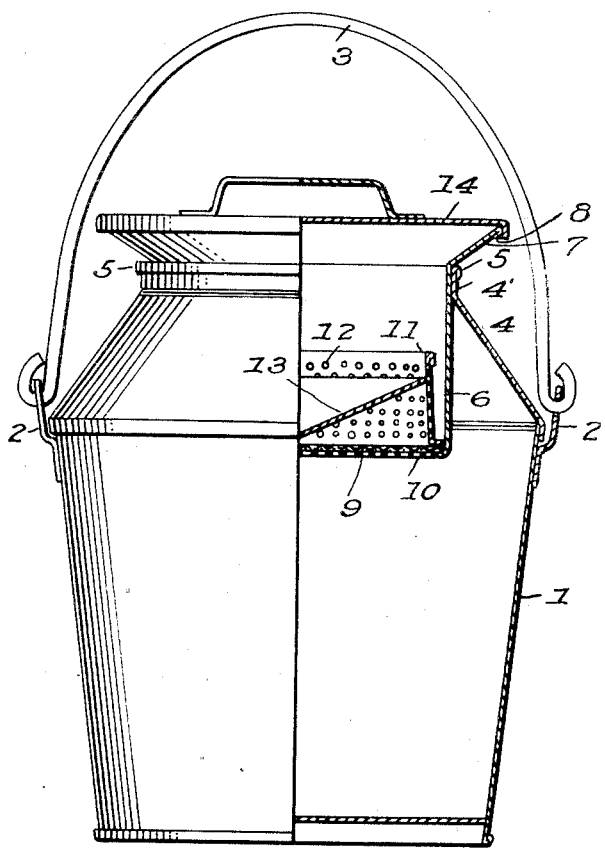
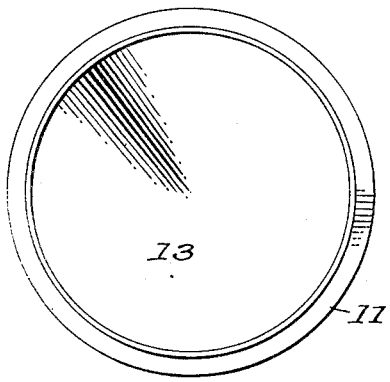
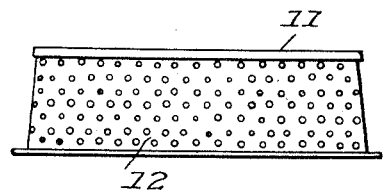
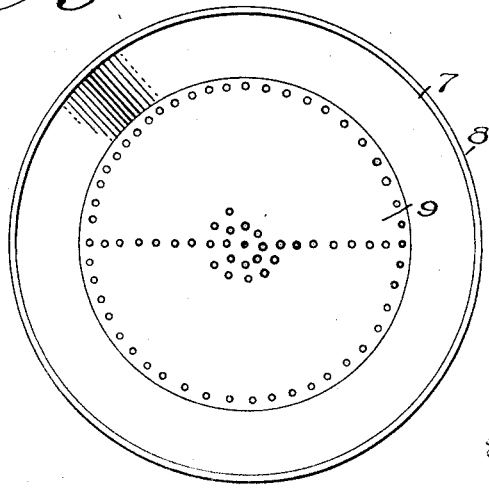
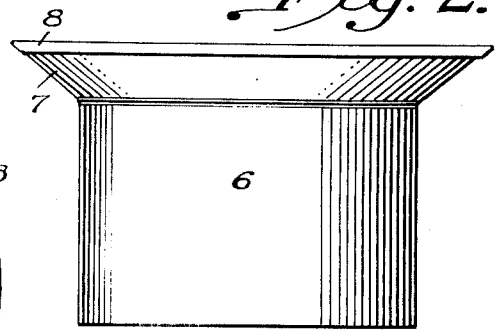
Inventors
STEFAN S. STARZEC
and YELMER V. SIMS
By Milans & Milans
Attorneys Patented Jan. 16, 1940

2,187,435

UNITED STATES PATENT OFFICE 2,187,435

STRAINER

Stefan S. Starzec, Starzec, and Yelmer V. Sims, Ladysmith, Wis.

Application September 23, 1937, Serial No. 165,408

3 Claims. (Cl. 210—155)

This invention relates to certain new and useful improvements in strainers and is adapted especially for use in connection with milking pails wherein it is desirable to filter the milk during the milking operation.

The main object of the invention is the provision of a filtering medium with a high degree of efficient filtration, the aim of the invention being to produce a product approaching maximum sanitation.

A further object of the invention resides in the novel provision of a cup or reservoir at the inner end of the strainer, which prevents to a measured degree the splashing of the milk on its initial entry into the straining element.

Another object of the invention resides in the novel manner of preventing disruption of the filtering pad by the direct and forcible entry of the milk thereon.

A still further aim of the invention is to produce a strainer which may be readily dissociated from the pail or container in order that the same may be cleansed.

These and other objects will readily present themselves to those skilled in the art to which the invention belongs when the following description is read in connection with the attached drawing; but it is to be understood that certain changes or modifications may be resorted to without departing from the spirit of the invention.

The protection contemplated will appear from the appended claims.

In the drawing like numerals indicate the same parts throughout the several views, wherein Fig. 1 is a view in elevation, partly in section to more clearly illustrate the assembled construction;

Fig. 2 is a detail view in elevation of the cylindrical casing which is fitted within the mouth of the receptacle or pail;

Fig. 3 is a top plan view of the cylindrical casing shown in Fig. 2;

Fig. 4 is a detail view of the receiving pan; and

Fig. 5 is a top plan view of the receiving pan.

For the purpose of illustrating this invention, the strainer element is shown as used in connection with a milking pail, designated 1, having the usual bail ears 2, 2 and a carrying handle 3. The upper portion of the pail 1 has a frustum-shaped hood 4, and a circular straight wall portion or neck 4'. The upper edge of the neck portion 4' terminates in a rolled rim 5.

Slidably fitted within the open-mouth receptacle is a cylindrical casing, designated 6, which at its upper end is provided with an outwardly-flared wall 7 which terminates in a rolled rim 8. The bottom wall 9 of the cylindrical casing 6 is perforated to permit the flow of fluid therethrough. Overlying the perforated bottom wall 9 is a filtering pad 10 which may be composed of any suitable fibrous material.

Slidably fitted within the cylindrical casing 6 is a receiving pan 11, the side wall of which is of a tapering or cone-shaped formation and is perforated, as suggested, at 12. The bottom edge of this receiving pan snugly fits within the cylindrical casing 6 and rests upon the filtering pad 10. This effectively holds the filtering pad in its proper position and prevents the same from floating away from the perforated bottom wall of the cylindrical casing. Within the perforated side wall of the receiving pan is a receiving cup or well 13 and, as will be noted from the cross-sectional view in Fig. 1, this receiving well or cup is attached to the side wall of the receiving pan below the top edge thereof.

A suitable cover 14 is provided for the pail and is adapted to tightly fit over the rolled rim 8 of the cylindrical casing 6.

With the parts in their assembled relation, as shown in section in Fig. 1, and with the cover 14 removed, the initial entry of the milk or other fluid will first fill the receiving cup or well 13, thereby forming a reservoir which prevents excessive splashing of the milk as the same is injected into the pail. The surplus fluid from this cup 13 will flow through the exposed perforations in the side wall of the receiving pan 11, and the fluid will then find its way through the other perforations of the side wall 12 onto the filtering pad 10. This pad 10 will effectively trap or retain any foreign substances that may be carried with the milk. The filtered milk will then flow through the perforated bottom 9 to the interior of the pail.

The various parts of the assemblage may be easily separated for the purpose of cleaning or washing the same.

We claim:

1. A strainer comprising a cylindrical casing having a perforated bottom wall, a perforated band arranged within the cylindrical casing and relatively spaced from the side wall thereof, and a cup peripherally suspended within the perforated band below the upper row of perforations therein, whereby a limited amount of fluid will be retained in the cup and the surplus fluid will flow over the upper edge of the cup through the perforated band and finally through the perforated bottom wall of the cylindrical casing.

2. A strainer comprising a cylindrical casing having a perforated bottom wall, a filter pad overlying said perforated wall, a perforated band within the cylindrical casing and relatively spaced from the side wall thereof, said band contacting at its lower end with the filter pad to retain said pad in position, and an imperforate cup arranged within the perforated band below the top edge thereof, whereby a limited amount of fluid will be retained in said cup and the surplus fluid will overflow from the cup through the perforated band and onto the filter pad.

3. A strainer comprising a cylindrical casing having a perforated bottom wall, and a receiving pan supported on the perforated bottom wall of the cylindrical casing and in spaced relation to the side wall of said casing, said receiving pan comprising an imperforate cup-shaped member and a perforated wall member, said cup-shaped member having its upper edge extending above the perforated bottom wall of the casing, and said perforated wall member making a fluid tight connection with the upper edge of the cup-shaped member and extending upwardly therefrom, whereby a limited amount of fluid will be retained in said cup-shaped member and the surplus fluid will overflow from the upper edge thereof through the perforated wall member and through the perforated bottom wall of the casing.

STEFAN S. STARZEC.
YELMER V. SIMS.